US009656238B2

(12) United States Patent
Ogura et al.

(10) Patent No.: US 9,656,238 B2
(45) Date of Patent: May 23, 2017

(54) FE(II)-SUBSTITUTED BETA-TYPE ZEOLITE, PRODUCTION METHOD THEREFOR AND GAS ADSORBENT INCLUDING SAME, AND NITRIC OXIDE AND HYDROCARBON REMOVAL METHOD

(71) Applicants: UniZeo Co., Ltd., Tokyo (JP); THE UNIVERSITY OF TOKYO, Tokyo (JP)

(72) Inventors: Masaru Ogura, Tokyo (JP); Keiji Itabashi, Tokyo (JP); Tatsuya Okubo, Tokyo (JP); Shanmugam Palani Elangovan, Tokyo (JP)

(73) Assignee: UniZeo Co., Ltd., Tokyo (JP)

( * ) Notice: Subject to any disclaimer, the term of this patent is extended or adjusted under 35 U.S.C. 154(b) by 65 days.

(21) Appl. No.: 14/414,350

(22) PCT Filed: Jul. 16, 2013

(86) PCT No.: PCT/JP2013/069249
§ 371 (c)(1),
(2) Date: Jan. 12, 2015

(87) PCT Pub. No.: WO2014/013967
PCT Pub. Date: Jan. 23, 2014

(65) Prior Publication Data
US 2015/0182941 A1 Jul. 2, 2015

(30) Foreign Application Priority Data
Jul. 18, 2012 (JP) ................. 2012-159148

(51) Int. Cl.
B01D 53/56 (2006.01)
B01J 20/18 (2006.01)
C01B 39/46 (2006.01)
B01D 53/02 (2006.01)
B01D 53/94 (2006.01)
B01J 20/28 (2006.01)
B01J 29/76 (2006.01)
B01D 53/04 (2006.01)
B01J 20/30 (2006.01)
C01B 39/02 (2006.01)
F01N 3/08 (2006.01)

(52) U.S. Cl.
CPC .............. B01J 20/18 (2013.01); B01D 53/02 (2013.01); B01D 53/04 (2013.01); B01D 53/9481 (2013.01); B01J 20/186 (2013.01); B01J 20/28057 (2013.01); B01J 20/28071 (2013.01); B01J 20/3085 (2013.01); B01J 29/7615 (2013.01); C01B 39/02 (2013.01); C01B 39/46 (2013.01); F01N 3/0835 (2013.01); F01N 3/0842 (2013.01); B01D 2253/108 (2013.01); B01D 2253/1085 (2013.01); B01D 2253/1122 (2013.01); B01D 2253/306 (2013.01); B01D 2253/311 (2013.01); B01D 2257/404 (2013.01); B01D 2257/702 (2013.01)

(58) Field of Classification Search
CPC .... B01D 53/02; B01D 53/04; B01D 53/0481; B01D 2253/108; B01D 2253/1085; B01D 2253/1122; B01D 2253/306; B01D 2253/311; B01D 2257/404; B01D 2257/702; C01B 39/02; C01B 39/46; B01J 20/18; B01J 20/186; B01J 20/28057; B01J 20/28071; B01J 20/3085; B01J 20/7615; F01N 3/0835; F01N 3/0842
USPC ......... 95/90, 129, 143; 96/108, 153; 502/74; 423/239.2, DIG. 27
See application file for complete search history.

(56) References Cited

U.S. PATENT DOCUMENTS 4,923,690 A  5/1990 Valyocsik et al.
5,286,693 A  2/1994 Ino et al.
(Continued)

FOREIGN PATENT DOCUMENTS

CN  101249968 A  8/2008
DE  19712727 C1  9/1998
(Continued)

OTHER PUBLICATIONS

International Search Report dated Aug. 20, 2013 issued in corresponding application No. PCT/JP2013/069249.
Kawakami et al.,"Theoretical investigation of novel two-step decomposition of nitric oxide over Fe(II) ion-exchanged zeolites using DFT calculations", Catalysis Today, G Model, CATTOD-9085, 2014, pp. 1-8.
Ogura et al., "Stabilization of bare divalent Fe(II) cations in Al-rich beta zeolites for superior NO adsorption", Journal of Catalysis, vol. 315, 2014, pp. 1-5.
Extended European Search Report dated Jul. 8, 2015, issued in counterpart European Patent Application No. 13820472.2 (6 pages).
Masaru Ogura et al., "Hydrocarbon Reformer Trap by Use of Transition Metal Oxide-Incorporated Beta Zeolites", Catal Lett., (2007), vol. 118, pp. 72-78.
Office Action dated Aug. 17, 2014, issued in counterpart German Patent Application No. 1120012000495.7, with English translation. (9 pages).
(Continued)

Primary Examiner — Frank Lawrence
(74) Attorney, Agent, or Firm — Westerman, Hattori, Daniels & Adrian, LLP

(57) ABSTRACT

The purpose of/problem to be addressed by the present invention is to provide: an Fe(II)-substituted beta-type zeolite useful for the catalytic removal of a variety of gases; and a production method therefor. The $SiO_2/Al_2O_3$ ratio in this Fe(II)-substituted beta-type zeolite is equal to or more than 7 but less than 10. This Fe(II)-substituted beta-type zeolite is obtained by being subjected to ionic exchange with Fe(II) ions. It is preferable that the Fe(II) loading amount be in the range of 0.001-0.4 mmol/g of the Fe(II)-substituted beta-type zeolite. It is preferable that the Fe(II)-substituted beta-type zeolite be produced using a method in which a beta-type zeolite having an $SiO_2/Al_2O_3$ ratio of equal to or more than 7 but less than 10 is dispersed in an Fe(II) water-soluble-compound aqueous solution, and then mixed and agitated to cause the beta-type zeolite to carry Fe(II) ions.

10 Claims, 1 Drawing Sheet

(56) References Cited

U.S. PATENT DOCUMENTS

| | | | |
|---|---|---|---|
| 5,520,895 A * | 5/1996 | Sharma | B01D 53/8621 423/239.1 |
| 5,804,155 A | 9/1998 | Farrauto et al. | |
| 6,248,684 B1 * | 6/2001 | Yavuz | B01D 53/864 502/64 |
| 6,286,693 B1 | 9/2001 | Brown | |
| 7,501,105 B2 | 3/2009 | Nagata et al. | |
| 9,108,187 B2 | 8/2015 | Ogura et al. | |
| 2004/0001782 A1 * | 1/2004 | Kumar | B01J 23/44 422/180 |
| 2004/0226440 A1 * | 11/2004 | Foong | B01D 53/0407 95/146 |
| 2005/0201916 A1 * | 9/2005 | Yavuz | B01D 53/864 423/239.2 |
| 2007/0248517 A1 | 10/2007 | Nagata et al. | |
| 2008/0083213 A1 | 4/2008 | Tanada et al. | |
| 2008/0145310 A1 | 6/2008 | Breuninger | |
| 2008/0261803 A1 | 10/2008 | Luo et al. | |
| 2009/0048095 A1 | 2/2009 | Li et al. | |
| 2009/0082194 A1 | 3/2009 | Tissler et al. | |
| 2009/0143221 A1 | 6/2009 | Ogunwumi et al. | |
| 2010/0137127 A1 | 6/2010 | Kanazawa | |
| 2010/0143224 A1 | 6/2010 | Li et al. | |
| 2010/0228061 A1 | 9/2010 | Harkonen et al. | |
| 2010/0316538 A1 * | 12/2010 | Buelow | B01J 20/103 422/177 |
| 2011/0105303 A1 | 5/2011 | Takahashi et al. | |
| 2011/0136657 A1 | 6/2011 | Takamitsu et al. | |
| 2011/0286914 A1 * | 11/2011 | Li | B01D 53/9418 423/700 |
| 2012/0190534 A1 | 7/2012 | Itabashi et al. | |
| 2013/0045860 A1 | 2/2013 | Xiao | |
| 2013/0156690 A1 | 6/2013 | Itabashi et al. | |
| 2014/0157987 A1 | 6/2014 | Ogura et al. | |
| 2016/0030933 A1 * | 2/2016 | Ogura | B01J 29/7615 423/700 |

FOREIGN PATENT DOCUMENTS

| | | |
|---|---|---|
| EP | 2876086 A1 | 5/2015 |
| JP | S61-10022 A | 1/1986 |
| JP | H07-247114 | 9/1995 |
| JP | 2002-321912 A | 11/2002 |
| JP | 2007-76990 A | 3/2007 |
| JP | 2008-73625 A | 4/2008 |
| JP | 2008-519748 A | 6/2008 |
| JP | 2008-264702 A | 11/2008 |
| JP | 2008-542173 A | 11/2008 |
| JP | 2009-520583 A | 5/2009 |
| JP | 2010-70450 A | 4/2010 |
| JP | 2010-536692 A | 12/2010 |
| JP | 2011-116627 A | 6/2011 |
| JP | 2012-126632 A | 7/2012 |
| JP | 2012-162446 A | 8/2012 |
| WO | 02/41991 A2 | 5/2002 |
| WO | 2006/011575 A1 | 2/2006 |
| WO | 2010/145077 A1 | 12/2010 |
| WO | 2010/146156 A1 | 12/2010 |
| WO | 2011/013560 A1 | 2/2011 |
| WO | 2011/146615 A2 | 11/2011 |
| WO | 2012/099090 A1 | 7/2012 |

OTHER PUBLICATIONS

Extended (Supplementary) European Search Report dated Mar. 2, 2016, issued in counterpart European Patent Application No. 14763299.6. (8 pages).

Non-Final Office Action dated May 19, 2016, issued in U.S. Appl. No. 14/775,331. (27 pages).

International Search Report dated Apr. 24, 2012, issued in International Application No. PCT/JP2012/050778. (2 pages).

International Search Report dated Apr. 8, 2014, issued in International Application No. PCT/JP2014/056118. (1 page).

Final Office Action dated Nov. 30, 2016, issued in U.S. Appl. No. 14/775,331. (26 pages).

* cited by examiner

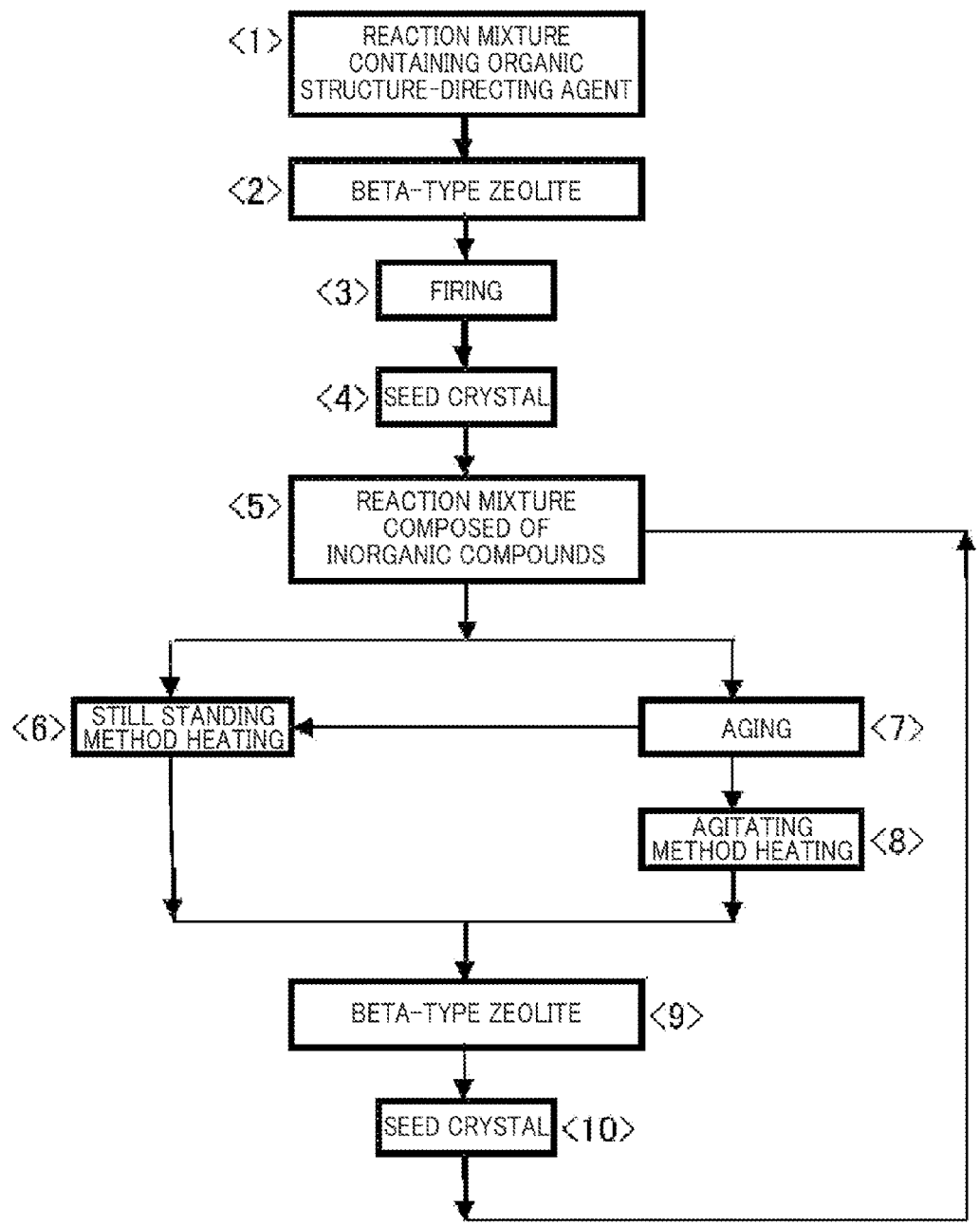

FE(II)-SUBSTITUTED BETA-TYPE ZEOLITE, PRODUCTION METHOD THEREFOR AND GAS ADSORBENT INCLUDING SAME, AND NITRIC OXIDE AND HYDROCARBON REMOVAL METHOD

TECHNICAL FIELD

The present invention relates to an Fe (II)-substituted beta-type zeolite, a gas adsorbent including same and a production method therefor. The present invention also relates to an adsorbent for adsorbing and removing nitric oxide gas and hydrocarbon gas in a gas phase such as exhaust gas of an internal combustion engine, and to a method for removing nitric oxide gas and hydrocarbon gas from the gas phase.

BACKGROUND ART

It has been proposed that a beta-type zeolite obtained by being subjected to ionic exchange with iron ions is used as a vehicle exhaust gas purification catalyst (See, Patent Documents 1 to 3). In Patent Document 1, for example, a denitration catalyst comprising a carrier obtained by a beta-type zeolite having an $SiO_2/Al_2O_3$ molar ratio of 15 to 300 being subjected to ionic exchange with 0.1 to 15% by mass of $Fe^{3+}$ ions, and ferric oxide carried on the carrier is described.

In Patent Document 2, it is described that a beta-type zeolite having a skeletal structure in which Si percentage content assigned to $Q^4$ of zeolite skeleton as observed in $^{29}Si$ MAS NMR spectrum is 35-47% by mass and having an $SiO_2/Al_2O_3$ molar ratio of equal to or more than 20 but less than 100 is subjected to ionic exchange to cause it to carry $Fe^{3+}$ and to be brought into contact with exhaust gas containing nitrogen oxides.

In Patent Document 3, a method for producing an $NO_x$ adsorbing material is described. This method comprises an impregnating step of impregnating a beta-type zeolite with iron chloride aqueous solution to form an iron chloride-containing zeolite, an ionic exchange step of heating the iron chloride-containing zeolite at 330-500° C. under an atmosphere containing no water to cause Fe to be subjected to ionic exchange, and a heat treatment step of heat treating the iron chloride-containing zeolite after the ionic exchange step under a non-oxidizing atmosphere.

Patent Document 1: Pamphlet of PCT International Publication No. WO2006/11575
Patent Document 2: Japanese Unexamined Patent Application, Publication No. 2007-076990
Patent Document 3: Japanese Unexamined Patent Application, Publication No. 2008-264702

DISCLOSURE OF THE INVENTION

Problems to be Solved by the Invention

However, it is not easy to effectively adsorb and remove nitric oxide even using the material described above, if oxygen is present in exhaust gas at a high concentration or the temperature of the exhaust gas is low when nitric oxide is catalytically removed.

An object of the present invention is to provide a beta-type zeolite which can solve various drawbacks of the prior art described above.

Means for Solving the Problems

As a result of keen examination, the present inventors have found that the above object can be achieved using an Fe (II)-substituted beta-type zeolite obtained by being subjected to ionic exchange with Fe (II) and having a specific $SiO_2/Al_2O_3$ ratio.

That is, the present invention provides an Fe (II)-substituted beta-type zeolite having an $SiO_2/Al_2O_3$ ratio of equal to or more than 7 but less than 10 and obtained by being subjected to ionic exchange with Fe (II) ions.

The present invention also provides a gas adsorbent comprising the Fe (II)-substituted beta-type zeolite described above.

Furthermore, the present invention provides a method for producing an Fe (II)-substituted beta-type zeolite, which comprises a step of dispersing a beta-type zeolite having an $SiO_2/Al_2O_3$ ratio of equal to or more than 7 but less than 10 in an Fe (II) water-soluble-compound aqueous solution and then mixing and agitating to cause the beta-type zeolite to carry Fe (II) ions.

In addition, the present invention provides a method for removing nitric oxide, which comprises bringing an Fe (II)-substituted beta-type zeolite having an $SiO_2/Al_2O_3$ ratio of equal to or more than 7 but less than 10 and obtained by being subjected to ionic exchange with Fe (II) ions into contact with nitric oxide or nitric oxide-containing gas to cause nitric oxide to be adsorbed on the Fe (II)-substituted beta-type zeolite.

Moreover, the present invention provides a method for removing hydrocarbons, which comprises bringing an Fe (II)-substituted beta-type zeolite having an $SiO_2/Al_2O_3$ ratio of equal to or more than 7 but less than 10 and obtained by being subjected to ionic exchange with Fe (II) ions into contact with hydrocarbons or hydrocarbon-containing gas to cause hydrocarbons to be adsorbed on the Fe (II)-substituted beta-type zeolite.

Effects of the Invention

The present invention provides an Fe (II)-substituted beta-type zeolite useful in catalytically removing various gases and a production method therefor. In particular, the present invention allows efficiently adsorbing and removing nitric oxide and hydrocarbons even with lesser amount of Fe (II) introduced in the beta-type zeolite by substitution, when nitric oxide and hydrocarbons are catalytically removed.

BRIEF DESCRIPTION OF THE DRAWINGS

FIG. 1 is a flow chart for producing a pre-substituted beta-type zeolite used in the present invention.

PREFERRED MODE FOR CARRYING OUT THE INVENTION

The present invention will be explained based on its preferred embodiment below. The present invention relates to an Fe (II)-substituted beta-type zeolite obtained by a beta-type zeolite being subjected to ionic exchange with Fe (II) ions. The present invention also relates to a gas adsorbent comprising the Fe (II)-substituted beta-type zeolite. Fe (II) ions are carried on a beta-type zeolite by being subjected to ionic exchange with cations present in $[AlO_2]$-site in the beta-type zeolite. The important point in the present invention is that the iron ions subjected to ionic exchange with cations contained in the beta-type zeolite are Fe (II) ions. A desired level of gas removal effect cannot be developed, if the iron ions subjected to ionic exchange with cations are Fe (III) ions. The present inventors believe that the reason for this relates to, as the beta-type zeolite, using the one having particular physical property values described below.

Though the desired level of gas removal effect cannot be developed if the iron ions subjected to ionic exchange with cations are Fe (III) ions, this shall not preclude the Fe (II)-substituted beta-type zeolite used in the present invention from carrying Fe (III) ions. That is, it is accepted that the Fe (II)-substituted beta-type zeolite carries Fe (III) ions.

In the present invention, examples of gases targeted by adsorption using the Fe (II)-substituted beta-type zeolite include nitric oxide gas and hydrocarbon gas which are contained in exhaust gas of an internal combustion engine. For hydrocarbon gas, the Fe (II)-substituted beta-type zeolite of the present invention is especially useful in adsorbing alkanes such as methane, ethane, propane, butane, pentane, hexane, n-heptane and isooctane; alkenes such as ethylene, propylene, butene, pentene, methylpentene, hexene and methylhexene; aromatics such as benzene, toluene, xylene and trimethylbenzene and the like. If both nitric oxide and hydrocarbons are contained in the treatment target gas, both of these gases can be adsorbed simultaneously by using the Fe (II)-substituted beta-type zeolite of the present invention.

The amount of Fe(II) contained in the Fe (II)-substituted beta-type zeolite, that is, the loading amount preferably ranges from 0.001 to 0.4 mmol/g of the Fe (II)-substituted beta-type zeolite, more preferably from 0.001 to 0.3 mmol/g and preferably from 0.001 to 0.25 mmol/g. The adsorption efficiency of nitric oxide and hydrocarbons can be effectively enhanced by setting the loading amount of Fe (II) within this range. In particular, unexpectedly, as a result of consideration of the present inventors, it has been proven that setting the loading amount of Fe (II) lower increases the adsorption amount of nitric oxide more than setting it higher (comparison between Example 1 and 2, and Example 3 in Table 1 described below).

The loading amount of Fe (II) contained in the Fe (II)-substituted beta-type zeolite is measured by the following method. First, an Fe (II)-substituted beta-type zeolite to be measured is weighed. The Fe (II)-substituted beta-type zeolite is dissolved by hydrogen fluoride (HF), and the total iron amount in the solution is determined using an inductively coupled plasma emission spectrophotometer. Apart from this, the amount of Fe (III) contained in the Fe (II)-substituted beta-type zeolite to be measured is measured by $H_2$-TPR (temperature-programmed reduction). Then, the amount of Fe (II) is calculated by subtracting the amount of Fe (III) from the total iron amount.

In order to cause the beta-type zeolite to carry Fe (II) ions, for example, the following method can be employed. The beta-type zeolite is dispersed in an Fe (II) water-soluble-compound aqueous solution and then agitated and mixed. The beta-type zeolite is preferably mixed at 0.5-7 parts by mass in relation to 100 parts by mass of the aqueous solution. The addition amount of the Fe (II) water-soluble-compound may be set suitably depending on the degree of ionic exchange.

Mixing and agitating may be performed at room temperature or under heating. The solution temperature is preferably set at 10-30° C., if mixing and agitating is performed under heating. Mixing and agitating may also be performed under an atmospheric environment or under an inert gas atmosphere such as a nitrogen atmosphere.

When mixing and agitating are performed, a compound to prevent Fe (II) from being oxidized to Fe (III) may be added in water. Such a compound is preferably ascorbic acid, a compound which does not obstruct ionic exchange of Fe (II) ions and can prevent Fe (II) ions from being oxidized to Fe (III) ions. The addition amount of ascorbic acid is preferably 0.1 to 3 times, particularly 0.2 to 2 times the amount by mole of Fe (II) to be added in terms of effectively preventing oxidization of Fe (II).

After mixing and agitating for a predetermined time, the solid content is sucked and filtered, washed with water and dried to give an Fe (II)-substituted beta-type zeolite of interest. The X-ray diffraction diagram of the Fe (II)-substituted beta-type zeolite is almost the same as the X-ray diffraction diagram of the beta-type zeolite before causing it to carry Fe (II) ions. That is, the crystal structure of the zeolite is not changed by ionic exchange.

The Fe (II)-substituted beta-type zeolite used in the present invention has an $SiO_2/Al_2O_3$ ratio of equal to or more than 7 but less than 10, preferably equal to or more than 8 but less than 9.6. That is, the Fe (II)-substituted beta-type zeolite has a lower $SiO_2/Al_2O_3$ ratio. In general, a lower $SiO_2/Al_2O_3$ ratio in the zeolite means more ionic exchange sites. In other words, it means high ability to carry Fe (II) ions. Unexpectedly, as a result of consideration of the present inventors, it has been proven that in the Fe (II)-substituted beta-type zeolite having a lower $SiO_2/Al_2O_3$ ratio, the number of nitric oxide and hydrocarbon molecules which may be adsorbed on one Fe (II) ion can be increased. Thus, by using the Fe (II)-substituted beta-type zeolite of the present invention, nitric oxide and hydrocarbons can be efficiently adsorbed.

The Fe (II)-substituted beta-type zeolite of the present invention has preferably a BET specific surface area of 300 to 600 $m^2/g$, particularly 320 to 550 $m^2/g$ and especially 350 to 500 $m^2/g$, in addition to having the $SiO_2/Al_2O_3$ ratio described above. Besides, a micropore specific surface area preferably ranges from 270 to 500 $m^2/g$, particularly from 270 to 450 $m^2/g$ and especially from 270 to 400 $m^2/g$. Furthermore, a micropore volume preferably ranges from 0.14 to 0.25 $m^2/g$, particularly from 0.14 to 0.22 $m^2/g$ and especially from 0.14 to 0.21 $m^2/g$. Using, as the Fe (II)-substituted beta-type zeolite, the one having these physical property values, nitric oxide and hydrocarbons adsorption properties can be improved. As will be described below, these physical property values do not greatly differ from the corresponding physical property values in the beta-type zeolite before subjected to ionic exchange with Fe (II) ions.

The Fe (II)-substituted beta-type zeolite used in the present invention preferably contains lithium. This allows easy obtaining the Fe (II)-substituted beta-type zeolite having a lower $SiO_2/Al_2O_3$ ratio. The amount of lithium contained in the Fe (II)-substituted beta-type zeolite is preferably 0.001 to 0.4 mmol/g of the Fe (II)-substituted beta-type zeolite and more preferably 0.001 to 0.3 mmol/g.

The Fe (II)-substituted beta-type zeolite used in the present invention is excellent particularly in the trap performance of nitric oxide and hydrocarbons discharged at cold start of an internal combustion engine. Since the temperature of a three-way catalyst is not sufficiently high at cold start of a gasoline engine or a diesel engine, it is difficult to effectively purify exhaust gas by the three-way catalyst. However, in addition to the three-way catalyst, by using an adsorbent (catalyst) containing the Fe (II)-substituted beta-type zeolite used in the present invention, it is possible to trap nitric oxide contained in the exhaust gas of relatively low temperature at cold start and thereby purify the exhaust gas. On reaching the vicinity of the operating temperature of the three-way catalyst after a few minutes since cold start, nitric oxide and hydrocarbons that has been trapped in the Fe (II)-substituted beta-type zeolite used in the present invention are released, and the released nitric oxide and hydrocarbons are purified by the three-way catalyst which has reached the operating temperature.

In the present invention, the beta-type zeolite having particular physical property values is preferably used as a beta-type zeolite which is subjected to ionic exchange with Fe (II) ions. In particular, the beta-type zeolite used in the present invention (hereinafter referred to as "pre-substituted beta-type zeolite" in comparison to Fe (II)-substituted beta-type zeolite) is characterized in that it is an aluminum-rich zeolite having a lower $SiO_2/Al_2O_3$ ratio. Specifically, the pre-substituted beta-type zeolite is an aluminum-rich zeolite having an $SiO_2/Al_2O_3$ ratio of preferably equal to or more than 7 but less than 10, more preferably equal to or more than 8 but less than 9.6. Such an aluminum-rich pre-substituted beta-type zeolite has a BET specific surface area of preferably 300 to 700 $m^2/g$ and more preferably 350 to 600 $m^2/g$, as measured in the sodium-type zeolite. In addition, a micropore specific surface area preferably ranges from 270 to 500 $m^2/g$ and more preferably from 380 to 500 $m^2/g$, as measured in the sodium-type zeolite. Furthermore, a micropore volume preferably ranges from 0.14 to 0.25 $cm^3/g$ and more preferably from 0.14 to 0.21 $cm^3/g$, as measured in the sodium-type zeolite.

As described above, the $SiO_2/Al_2O_3$ ratio, the BET specific surface area, the micropore specific surface area and the micropore volume values in the pre-substituted beta-type zeolite do not greatly differ from the corresponding values in the Fe (II)-substituted beta-type zeolite.

The pre-substituted beta-type zeolite encompasses a sodium-type zeolite and further encompasses one that becomes an $H^+$-type by ionic exchange of sodium ions with protons. When the beta-type zeolite is an $H^+$-type, the aforementioned specific surface area and the like are measured after protons are substituted with sodium ions. In order to convert the beta-type zeolite from the sodium-type to the $H^+$-type, for example, the sodium-type beta-type zeolite is dispersed in an aqueous solution of an ammonium salt such as an ammonium nitrate, and the sodium ions in the zeolite are substituted with ammonium ions. The ammonium-type beta-type zeolite is fired, and thereby the $H^+$-type beta-type zeolite is obtained.

The aforementioned specific surface area and volume are measured using a BET surface area measuring device as described in the following examples.

The aluminum-rich pre-substituted beta-type zeolite having the aforementioned physical properties is suitably produced by the production method described below. The reason why in the present invention, the pre-substituted beta-type zeolite could achieve the aforementioned physical properties is presumed to have been able to suppress the occurrence of defects that may occur in the crystal structure of the pre-substituted beta-type zeolite obtained by using the production method, but the detailed are not clear.

Next, a preferred production method of the pre-substituted beta-type zeolite will be described in reference to FIG. 1. In FIG. 1, the conventional synthetic method of the beta-type zeolite using an organic SDA is performed in the order of <1>, <2>, and <3>. In addition, a method which is performed in the order of <1>, <2>, <3>, <4>, <5>, <6> and <9> is also known (for example, Chinese Patent Application Publication No. 101249968A (hereinafter, referred to as "conventional method")). In the conventional method, it is essential to use a seed crystal and for producing the seed crystal, it is essential to use an organic compound, tetraethylammonium ions as a structure-directing agent (hereinafter, referred to as "SDA"). Furthermore, in order to use the beta-type zeolite obtained by the conventional method as a seed crystal, it is necessary to remove tetraethylammonium ions by high temperature firing.

In contrast to this method, in the present invention, it is possible to produce a pre-substituted beta-type zeolite using six ways of methods. The first method is a method performed in the same order of <1>, <2>, <3>, <4>, <5>, <6> and <9> as that of the conventional method. But its reaction conditions are different from those of the conventional method. In accordance with the present invention, thus, a pre-substituted beta-type zeolite having a lower $SiO_2/Al_2O_3$ ratio can be produced. The second method is a method performed in the order of <1>, <2>, <3>, <4>, <5>, <7>, <6> and <9>. In this method, by still standing and heating after aging, a seed crystal having a lower $SiO_2/Al_2O_3$ ratio can be effectively used.

The third method is a method performed in the order of <1>, <2>, <3>, <4>, <5>, <7>, <8> and <9>. Its reaction conditions are also different from those of the conventional method.

In the present production method, the following three ways of orders are also possible.

<10>, <5>, <6>, <9>
<10>, <5>, <7>, <6>, <9>
<10>, <5>, <7>, <8>, <9>

In these cases, the reaction conditions such as the $SiO_2/Al_2O_3$ ratio of the seed crystal and the composition of the reaction mixture are also different from those of the conventional method. Moreover, in these three ways of methods, the pre-substituted beta-type zeolite obtained by the method of the present invention is used as a seed crystal to be used. That is, these three ways of methods do not essentially use an organic SDA, since the seed crystal can be used repeatedly. In short, these three ways of methods can be said to be producing methods of a beta-type zeolite based on a green process with an ultimately small environmental load.

The method of the pre-substituted beta-type zeolite used in the present invention will be described in more detail. The method performed in the order of <1>, <2> and <3> in FIG. 1 is the same as the method using the conventional organic SDA. In relation to the seed crystal of <4> in FIG. 1, in the conventional method, the $SiO_2/Al_2O_3$ ratio range of the seed crystal is limited to a narrow range of 22-25. In contrast to this, in the present production method, the $SiO_2/Al_2O_3$ ratio of the seed crystal shown in <4> of FIG. 1 is one of the features. In the present production method, a seed crystal having an $SiO_2/Al_2O_3$ ratio=8-30 can be used. The beta-type zeolite having the $SiO_2/Al_2O_3$ ratio of the seed crystal of less than 8 is not generally used because its synthesis is extremely difficult. In addition, if the $SiO_2/Al_2O_3$ ratio of the seed crystal exceeds 30, the product tends to become ZSM-5 independent of the composition of the reaction mixture. The addition amount of the seed crystal in the present production method is in the range of 0.1 to 20% by mass of the silica component contained in the reaction mixture. The addition amount is preferably less, but is determined taking account of the reaction rate and the inhibitory effect of impurities. The preferred addition amount ranges from 1 to 20 mass % and more preferably from 1 to 10 mass %.

The average particle size of a beta-type zeolite seed crystal used in the present production method is 150 nm or more, preferably ranges from 150 to 1000 nm and more preferably from 200 to 600 nm. The crystal size of the pre-substituted beta-type zeolite obtained by synthesis is not generally uniform, and has a certain particle size distribution and therefore, it is not difficult to determine the crystal particle size having a maximum frequency therein. The average particle size refers to the particle diameter of the crystal having the maximum frequency, as observed by a scanning electron microscope. The beta-type zeolite using an organic SDA generally has a small average particle size and it generally ranges from 100 nm to 1000 nm. However, there are also crystals which have unclear particle sizes because small particles are aggregated, or those having particle sizes of greater than 1000 nm. Further, in order to synthesis a crystal of 100 nm or less, a special device is necessary and becomes expensive. In the present production method, the beta-type zeolite having an average particle size of 150 nm or more is thus used as a seed crystal. Since the pre-substituted beta-type zeolite obtained by the present production method also has an average particle size in this range, it can be suitably used as a seed crystal.

The reaction mixture to which a seed crystal is added is obtained by mixing a silica source, an alumina source, an alkali source and water so that the reaction mixture has the composition represented by a molar ratio shown below, for example. If the composition of the reaction mixture is out of this range, it is not easy to obtain a pre-substituted beta-type zeolite of interest.

$SiO_2/Al_2O_3=6-40$
$Na_2O/SiO_2=0.05-0.25$
$Li_2O/SiO_2=0.005-0.25$
$H_2O/SiO_2=5-50$

The more preferred composition range of the reaction mixture is as follows.

$SiO_2/Al_2O_3=10-40$
$Na_2O/SiO_2=0.1-0.25$
$Li_2O/SiO_2=0.01-0.15$
$H_2O/SiO_2=10-25$

The silica source used to obtain the reaction mixture having said molar ratio includes silica itself and a silicon-containing compound capable of forming silicate ions in water. Specifically, wet process silica, dry process silica, colloidal silica, sodium silicate, aluminosilicate gels and the like can be referred to. These silica sources can be used alone or in combination of two or more. Among these silica sources, the use of silica (silicon dioxide) is preferred in that it is possible to obtain a zeolite without unwanted by-products.

As the alumina source, for example, a water-soluble aluminum-containing compound can be used. Specifically, sodium aluminate, aluminum nitrate, aluminum sulfate and the like can be referred to. Furthermore, aluminum hydroxide is also one of the preferred alumina sources. These alumina sources can be used alone or in combination with two or more. Among these alumina sources, the use of sodium aluminate or aluminum hydroxide is preferred in that it is possible to obtain a zeolite without unwanted by-products (for example, sulfates and nitrates and the like).

As the alkali source, in the case of sodium, for example, sodium hydroxide can be used. In the case of lithium, lithium halide such as lithium chloride and lithium bromide, lithium salts such as lithium acetate may be used, or lithium hydroxide may be used. In the case of using sodium silicate as the silica source or using sodium aluminate as the alumina source, sodium, an alkali metal component contained therein is considered as NaOH at the same time and it is also the alkali component. Thus, said $Na_2O$ is calculated as the sum of all alkali components in the reaction mixture.

When the reaction mixture having the following composition is used, it is possible to obtain a pre-substituted beta-type zeolite of interest, even if lithium ions are not contained in the reaction mixture.

$SiO_2/Al_2O_3=40-200$
$Na_2O/SiO_2=0.22-0.4$
$H_2O/SiO_2=10-50$

The more preferred composition range of the reaction mixture is as follows.

$SiO_2/Al_2O_3=44-200$
$Na_2O/SiO_2=0.24-0.35$
$H_2O/SiO_2=15-25$

The following range is preferably employed as the composition of the reaction mixture.

$SiO_2/Al_2O_3=10-40$
$Na_2O/SiO_2=0.05-0.25$
$H_2O/SiO_2=5-50$

The more preferred composition range of the reaction mixture is as follows.

$SiO_2/Al_2O_3=12-40$
$Na_2O/SiO_2=0.1-0.25$
$H_2O/SiO_2=10-25$

A method by which a uniform reaction mixture is easily obtained may be used as the order of addition of each raw material when preparing the reaction mixture. For example, at room temperature, an alumina source and a lithium source may be added to and dissolved in aqueous sodium hydroxide solution, followed by adding a silica source and agitating and mixing to give a uniform reaction mixture. A seed crystal is added while mixing with the silica source or after adding the silica source. Thereafter, the mixture is agitated and mixed to ensure uniform dispersion of the seed crystal. There is no restriction on the temperature when preparing the reaction mixture, and in general, the preparation may be performed at room temperature (20-25° C.)

The reaction mixture containing the seed crystal is placed in an airtight vessel and heated and reacted to crystallize the beta-type zeolite. An organic SDA is not contained in the reaction mixture. One method for crystallization is heating by a still standing method without aging, as shown in the conventional method (orders <4>, <5>, <6> and <9>).

On the other hand, if a seed crystal having a low $SiO_2/Al_2O_3$ ratio is used, the crystallization more easily proceeds by heating without agitating after aging (orders <4>, <5>, <7>, <6> and <9>). Aging refers to an operation of keeping the temperature lower than the reaction temperature for a certain period of time. In aging, in general, still standing is performed without agitating. It is known that aging has effects such as preventing by-production of impurities, allowing heating under agitation without by-production of impurities, and increasing the reaction rate, but their action mechanisms are not necessarily clear. The temperature and time of aging are set so that said effects can be maximally exhibited. In the present production method, aging is preferably performed at 20-80° C., more preferably at 20-60° C., preferably in the range of 2 hours to 1 day.

If the agitation is performed to achieve homogenization of the reaction mixture temperature during heating, heating and agitating after aging may prevent by-production of impurities (orders <4>, <5>, <7>, <8> and <9>). The agitation is performed in order to equalize the composition and temperature of the reaction mixture, and includes mixing with agitation blades and mixing by rotation of the vessel. The agitation intensity and speed of rotation may be adjusted depending on the temperature uniformity and the degree of impurities by-production. It may be intermittent agitation, not constant agitation. In this way, the combination of aging and agitation allows industrial mass production.

Three ways of methods described below is methods for producing a pre-substituted beta-type zeolite by a green process which is a feature of the present production method.

These three ways of methods allow infinite self-reproduction using the pre-substituted beta-type zeolite obtained as the seed crystal by the present production method and a production process using no organic SDA. That is, the three ways of methods are the method of the order of <10>, <5>, <6> and <9>, the method of the order of <10>, <5>, <7>, <6> and <9>, and the method of the order of <10>, <5>, <7>, <8> and <9>. Features of each step are as described above. If agitating and heating are performed, aging is preferably performed.

In either case of still standing method and agitating method, heating temperature ranges from 100 to 200° C., preferably from 120 to 180° C. and heating is performed under autogenous pressure. Generation efficiency of the beta-type zeolite becomes worse at temperatures below 100° C., since the crystallization rate becomes extremely slow. On the other hand, at temperatures higher than 200° C., since an autoclave with high pressure resistance is required, not only economic efficiency is lacked, but also generation rate of impurities increases. Heating time is not critical in the present production method, and heating may be performed until the beta-zeolite with sufficiently high crystallinity is produced. In general, heating for about 5 to 150 hours provides the pre-substituted beta-type zeolite with satisfactory crystallinity.

The crystal of pre-substituted beta-type zeolite is obtained by said heating. After completion of heating, the produced crystalline powders are separated from the mother liquor by filtration, followed by washing with water or warm water and drying. Firing is not needed because it contains no organic materials in its dried state.

The pre-substituted beta-type zeolite thus obtained is subjected to ionic exchange with Fe (II) ions to become an Fe (II)-substituted beta-type zeolite as mentioned above. The Fe (II)-substituted beta-type zeolite may be used as a gas adsorbent for various gases such as nitric oxide and hydrocarbons in this state, or may be used as a gas adsorbent containing the Fe (II)-substituted beta-type zeolite. Irrespective of the form of the Fe (II)-substituted beta-type zeolite, various gases such as nitric oxide and hydrocarbons can be adsorbed on the Fe (II)-substituted beta-type zeolite by bring the Fe (II)-substituted beta-type zeolite into solid-gas contact with the gases.

In the present invention, in addition to the adsorption of nitric oxide gas and hydrocarbon gas by bringing nitric oxide gas and hydrocarbon gas themselves into contact with the Fe (II)-substituted beta-type zeolite, by bringing nitric oxide gas and hydrocarbon gas-containing gas into contact with the Fe (II)-substituted beta-type zeolite, nitric oxide gas and hydrocarbon gas therein can be adsorbed and removed therefrom. Examples of such gases include exhaust gas of an internal combustion engine fueled by hydrocarbons such as gasoline and light oil, and exhaust gas generated from various boilers and incinerators.

EXAMPLES

Hereinafter, the present invention will be described in more detail by examples. However, the scope of the present invention is not limited to such examples. Unless mentioned otherwise, "%" refers to "% by mass". Analyzers used in the examples, comparative examples and reference examples below are as follows.

Powder X-ray diffraction device: powder X-ray diffraction device MO3XHF[22] (radiation of CuKα-ray, voltage of 40 kV, current of 30 mA, scan step of 0.02°, and scan speed of 2°/min) made by Mac Science Co., Ltd.

$SiO_2/Al_2O_3$ ratio: A beta-type zeolite was dissolved with hydrogen fluoride (HF) and the solution was analyzed using ICP to quantify Al. In addition, a beta-type zeolite was dissolved with potassium hydroxide (KOH) and the solution was analyzed using ICP to quantify Si. The $SiO_2/Al_2O$ ratio was calculated based on the quantified amount of Si and Al.

BET specific surface area, micropore specific surface area and micropore volume measuring device: AUTOSORB-1 made by Quantachrome Instruments Co., Ltd.

Example 1

(1) Production of Pre-Substituted Beta-Type Zeolite

This is an example of producing an Fe (II)-substituted beta-type zeolite having an $SiO_2/Al_2O_3$ ratio of 9.4. In 12.71 g of pure water, 0.801 g of sodium aluminate and 1.443 g of 36% sodium hydroxide were dissolved. A mixture of 3.048 g of finely powdered silica and 0.305 g of beta-type zeolite seed crystals having an $SiO_2/Al_2O_3$ ratio=24.0 was gradually added to the aqueous solution, and agitated and mixed to give a reaction mixture having a composition of $SiO_2/Al_2O_3$=18.0, $Na_2O/SiO_2$=0.20 and $H_2O/SiO_2$=15. The beta-type zeolite seed crystal is the one obtained by the method mentioned below using an SDA. The reaction mixture was put into a 60 cc stainless airtight vessel, and subjected to still standing and heating at 150° C. under autogenous pressure for 60 hours without aging and agitating. After cooling the airtight vessel, the product was filtered and washed with warm water to give a white powder. The product was subjected to XRD measurement to confirm that it was a beta-type zeolite containing no impurities such as an SDA. The physical property values of the pre-substituted beta-type zeolite thus obtained are shown in Table 1.

[Production Method of Beta-Type Zeolite Seed Crystals]

Tetraethylammonium hydroxide was used as an SDA, and according to the conventional known method using sodium aluminate as an alumina source and finely powdered silica (Mizukasil P707) as a silica source, a beta-type zeolite having an $SiO_2/Al_2O_3$ ratio of 24.0 was synthesized by agitating and heating at 165° C. for 96 hours. This was fired at 550° C. for 10 hours while circulating air in an electric furnace to produce a crystal containing no organic materials. This crystal was confirmed to be a beta-type zeolite according to the result of X-ray diffraction. This crystal was observed by a scanning electron microscope, proving that the average particle size was 280 nm. The beta-type zeolite contained no SDAs.

(2) Production of Fe (II)-Substituted Beta-Type Zeolite

To a polypropylene vessel, 60 ml of distilled water, 1 g of the pre-substituted beta-type zeolite and twice the molar amount of iron compounds to be added of ascorbic acid were added, and then, 10% by mass of Fe (II) $SO_4 \cdot 7H_2O$ in relation to the pre-substituted beta-type zeolite was added and agitated at room temperature under nitrogen atmosphere for one day. Thereafter, the precipitate was sucked and filtered, washed with distilled water and dried to give an Fe (II)-substituted beta-type zeolite carrying 0.065 mmol/g of $Fe^{2+}$. The loading amount of $Fe^{2+}$ was determined by the method described above. As a result of performing XRD measurement of the resulting Fe (II)-substituted beta-type zeolite, it was observed that the peak position and the peak intensity were substantially the same as those of the pre-substituted beta-type zeolite and it was confirmed that the structure of the beta-type zeolite was maintained after ionic exchange.

(3) Evaluation of Nitric Oxide Gas Adsorption

Using an electronic balance, 20 mg of the Fe (II)-substituted beta-type zeolite was weighed accurately, followed by using 180 mg of silicon carbide as a diluent and mixing them so as to be equal to each other. The mixture was packed in a quartz glass tube having an inner diameter of 6 mm. Adsorbed water during mixing was heated by a mantle heater to be removed, and then cooled to room temperature. Then, 5 cm$^3$ of 1030 ppm nitric oxide was pulsed in the quartz glass tube at room temperature every 2 minutes. The amount of nitric oxide gas that had come out of the quartz glass tube without being adsorbed was calculated from peak areas of thermal conductivity-type gas chromatograph (GC-TCD, made by Shimadzu Corporation, GC-8A) and values detected by chemiluminescence-type NO analyzer (NOx analyzer, made by Yanagimoto Seisakusho Co., Ltd., ECL-77A). Measurement conditions of the thermal conductivity-type gas chromatograph (GC-TCD) are shown below. Then, the amount of nitric oxide gas adsorbed on the Fe (II)-substituted beta-type zeolite per unit mass was determined by subtracting the calculated values from the supply amount of nitric oxide gas. The results are shown in Table 1 below.
[Measurement Conditions of Thermal Conductivity-Type Gas Chromatograph (GC-TCD)]
  Carrier gas: He gas
  Carrier gas flow rate: 30 cm$^3$·min$^{-1}$
  Detecting part temperature: 100° C.
  Detecting part current: 80 mA (4) Evaluation of Toluene Gas Adsorption Toluene, which is typical of hydrocarbons contained in exhaust gas discharged from an internal combustion engine, was used as an adsorption target gas. In a quartz tube having an inner diameter of 4 mm, 20 mg of the Fe (II)-substituted beta-type zeolite was placed, and held between quartz wool and glass beads. Helium was used as a mobile phase, and the sample was activated at 390° C. for about 1 hour. After cooling the column to 50° C., toluene was injected into the column until saturated. The amount of toluene gas that had come out of the quartz glass tube without being adsorbed was calculated from values detected as peak areas of thermal conductivity-type gas chromatograph (GC-TCD, made by Shimadzu Corporation, GC-8A). Measurement conditions of the thermal conductivity-type gas chromatograph (GC-TCD) are shown below. Then, the amount of toluene gas adsorbed on the Fe (II)-substituted beta-type zeolite per unit mass was determined by subtracting the calculated values from the supply amount of toluene gas. The results are shown in Table 1 below.
[Measurement Conditions of Thermal Conductivity-Type Gas Chromatograph (GC-TCD)]
  Carrier gas: He gas
  Carrier gas flow rate: 30 cm$^3$·min$^{-1}$
  Detecting part temperature: 150° C.
  Detecting part current: 50 mA Examples 2 and 3

An Fe (II)-substituted beta-type zeolite was obtained in a similar way to Example 1, except that 20% by mass (Example 2) and 40% by mass (Example 3) of Fe (II) SO$_4$.7H$_2$O in relation to the pre-substituted beta-type zeolite were added. The loading amount of Fe$^{2+}$ was as shown in Table 1. The resulting Fe (II)-substituted beta-type zeolite was evaluated in a similar way to Example 1. The results are shown in Table 1. It should be noted that though the addition amount of Fe (II) SO$_4$.7H$_2$O was greater in Example 3 than in Example 2, the loading amount of Fe$^{2+}$ was greater in Example 2.

Example 4

(1) Production of Pre-Substituted Beta-Type Zeolite

This is an example of producing an Fe (II)-substituted beta-type zeolite having an SiO$_2$/Al$_2$O ratio of 8.8. In 12.73 g of pure water, 0.898 g of sodium aluminate and 1.337 g of 36% sodium hydroxide were dissolved. A mixture of 3.039 g of finely powdered silica and 0.304 g of beta-type zeolite seed crystals having an SiO$_2$/Al$_2$O$_3$ ratio=24.0 was gradually added to the aqueous solution, and agitated and mixed to give a reaction mixture having a composition of SiO$_2$/Al$_2$O$_3$=16.0, Na$_2$O/SiO$_2$=0.20 and H$_2$O/SiO$_2$=15. The beta-type zeolite seed crystals are similar to those used in Example 1. The reaction mixture was put into a 60 cc stainless airtight vessel, and subjected to still standing and heating at 150° C. under autogenous pressure for 60 hours without aging and agitating. After cooling the airtight vessel, the product was filtered and washed with warm water to give a white powder. The product was subjected to XRD measurement to confirm that it was a beta-type zeolite containing no impurities such as an SDA. The physical property values of the pre-substituted beta-type zeolite thus obtained are shown in Table 1.

(2) Production of Fe (II)-Substituted Beta-Type Zeolite

To a polypropylene vessel, 60 ml of distilled water, 1 g of the pre-substituted beta-type zeolite and twice the molar amount of iron compounds to be added of ascorbic acid were added, and then, 40% by mass of Fe (II) SO$_4$.7H$_2$O in relation to the pre-substituted beta-type zeolite was added and agitated at room temperature under nitrogen atmosphere for one day. Thereafter, the precipitate was sucked and filtered, washed with distilled water and dried to give an Fe (II)-substituted beta-type zeolite carrying 0.117 mmol/g of Fe$^{2+}$. As a result of performing XRD measurement of the resulting Fe (II)-substituted beta-type zeolite and the pre-substituted beta-type zeolite, it was observed that the peak position and the peak intensity were substantially the same and it was confirmed that the structure of the beta-type zeolite was maintained after ionic exchange. The resulting Fe (II)-substituted beta-type zeolite was evaluated in a similar way to Example 1. The results are shown in Table 1.

Example 5

This is an example of producing an Fe (II)-substituted beta-type zeolite having an SiO$_2$/Al$_2$O$_3$ ratio of 8.8. In 14.54 g of pure water, 0.477 g of sodium aluminate, 0.822 g of 36% sodium hydroxide and 0.141 g of lithium hydroxide monohydrate were dissolved to give an aqueous solution. A mixture of 2.017 g of finely powdered silica and 0.202 g of beta-type zeolite seed crystals having an SiO$_2$/Al$_2$O$_3$ ratio=24.0 was gradually added to the aqueous solution, and agitated and mixed to give a reaction mixture having a composition of SiO$_2$/Al$_2$O$_3$=20.0, Na$_2$O/SiO$_2$=0.175, Li$_2$O/

$SiO_2=0.05$ and $H_2O/SiO_2=25$. The beta-type zeolite seed crystals are similar to those used in Example 1. The reaction mixture was put into a 60 cc stainless airtight vessel, aged at 80° C. for 16 hours and then, subjected to still standing and heating at 150° C. under autogenous pressure for 72 hours without agitating. After cooling the airtight vessel, the product was filtered and washed with warm water to give a white powder. The product was subjected to XRD measurement to confirm that it was a beta-type zeolite containing no impurities such as an SDA. The physical property values of the pre-substituted beta-type zeolite thus obtained are shown in Table 1. Thereafter, $Fe^{2+}$ was carried on the zeolite in a similar way to Example 1. The loading amount of $Fe^{2+}$ was as shown in Table 1. The resulting Fe (II)-substituted beta-type zeolite was evaluated in a similar way to Example 1. The results are shown in Table 1.

Comparative Example 1

$H^+$-type beta-type zeolite made by Tosoh Corporation (model No. HSZ-940HOA, synthesized using an SDA) was used as a pre-substituted beta-type zeolite. An Fe (II)-substituted beta-type zeolite was obtained in a similar way to Example 1 except for this. The resulting Fe (II)-substituted beta-type zeolite was evaluated in a similar way to Example 1. The results are shown in Table 1.

Comparative Example 2

$NH_4^+$-type beta-type zeolite made by Tosoh Corporation (model No. HSZ-930NHA, synthesized using an SDA) was used as a pre-substituted beta-type zeolite. An Fe (II)-substituted beta-type zeolite was obtained in a similar way to Example 1 except for this. The resulting Fe (II)-substituted beta-type zeolite was evaluated in a similar way to Example 1. The results are shown in Table 1.

TABLE 1

| | Pre-substituted beta-type zeolite | | | | Fe (II)-substituted beta-type zeolite | | | | | | |
|---|---|---|---|---|---|---|---|---|---|---|---|
| | $SiO_2/$ $Al_2O_3$ | BET specific surface area ($m^2/g$) | Micropore specific surface area ($m^2/g$) | Micropore volume ($cm^3/g$) | $SiO_2/$ $Al_2O_3$ | BET specific surface area ($m^2/g$) | Micropore specific surface area ($m^2/g$) | Micropore volume ($cm^3/g$) | Fe (II) loading amount (mmol/g) | NO adsorption amount (mmol/g) | Toluene adsorption amount ($cm^3/g$) |
| Example 1 | 9.4 | 534 | 391 | 0.206 | 9.4 | 479 | 380 | 0.198 | 0.065 | 0.084 | 0.073 |
| Example 2 | 9.4 | 534 | 391 | 0.206 | 9.4 | 465 | 350 | 0.182 | 0.142 | 0.160 | 0.068 |
| Example 3 | 9.4 | 534 | 391 | 0.206 | 9.4 | 458 | 345 | 0.179 | 0.036 | 0.272 | 0.067 |
| Example 4 | 8.8 | 574 | 277 | 0.146 | 8.8 | 351 | 290 | 0.151 | 0.117 | 0.054 | 0.064 |
| Example 5 | 8.8 | 518 | 360 | 0.190 | 8.8 | 474 | 388 | 0.202 | 0.001 | 0.055 | 0.062 |
| Comparative Example 1 | 39.6 | 590 | 320 | 0.168 | 41.4 | 530 | 285 | 0.149 | 0.025 | 0.033 | 0.059 |
| Comparative Example 2 | 27.0 | 617 | 293 | 0.154 | 30.2 | 558 | 279 | 0.146 | 0.009 | 0.000 | 0.045 |

As is apparent from the results shown in Table 1, it is understood that by using the Fe (II)-substituted beta-type zeolite obtained in each Example, nitric oxide gas and toluene gas can be more efficiently adsorbed and removed, compared to using the Fe (II)-substituted beta-type zeolite obtained in each Comparative Example. In particular, as is apparent form the comparison between Examples 1 and 2, and Example 3, it is understood that the adsorption amount of nitric oxide is greater in Example 3 with less loading amount of Fe (II).

The invention claimed is:

1. An Fe (II)-substituted beta-type zeolite having an SiO2/Al2O3 ratio of equal to or more than 7 but less than 10 and obtained by being subjected to ionic exchange with Fe(II) ions, and wherein an Fe(II) loading amount is 0.001 to 0.25 mmol/g with respect to the Fe (II)-substituted beta-type zeolite, a BET specific surface area is 300 to 600 m2/g, a micropore specific surface area is 270 to 500 m2/g, and a micropore volume is 0.14 to 0.25 cm3/g.

2. The Fe (II)-substituted beta-type zeolite according to claim 1, wherein as the beta-type zeolite before subjected to ionic exchange with Fe (II) ions, a beta-type zeolite having an SiO2/Al2O3 ratio of equal to or more than 7 but less than 10 is used.

3. The Fe (II)-substituted beta-type zeolite according to claim 1, which contains lithium ions.

4. A gas adsorbent comprising the Fe (II)-substituted beta-type zeolite according to claim 1.

5. A method for producing an Fe (II)-substituted beta-type zeolite according to claim 1, which comprises a step of dispersing a beta-type zeolite having an SiO2/Al2O3 ratio of equal to or more than 7 but less than 10 in an Fe (II) water-soluble-compound aqueous solution and then mixing and agitating to cause the beta-type zeolite to carry Fe (II) ions.

6. The method according to claim 5, wherein 0.1 to 3 times the amount by mole of the Fe (II) of ascorbic acid is added to the aqueous solution upon the mixing and agitating.

7. A method for removing nitric oxide, which comprises bringing an Fe (II)-substituted beta-type zeolite according to claim 1 having an SiO2/Al2O3 ratio of equal to or more than 7 but less than 10 and obtained by being subjected to ionic exchange with Fe (II) ions into contact with nitric oxide or nitric oxide-containing gas to cause nitric oxide to be adsorbed on the Fe (II)-substituted beta-type zeolite.

8. A method for removing hydrocarbons, which comprises bringing an Fe (II)-substituted beta-type zeolite according to claim 1 having an SiO2/Al2O3 ratio of equal to or more than 7 but less than 10 and obtained by being subjected to ionic exchange with Fe (II) ions into contact with hydrocarbons or hydrocarbon-containing gas to cause hydrocarbons to be adsorbed on the Fe (II)-substituted beta-type zeolite.

9. The Fe (II)-substituted beta-type zeolite according to claim 1, wherein the loading amount of Fe (II) is no more than 0.142 mmol/g of the Fe (II)-substituted beta-type zeolite.

10. The Fe (II)-substituted beta-type zeolite according to claim 1, wherein, as the beta-type zeolite prior to ion exchange with Fe(II) ions, a beta-type zeolite with a BET specific surface area of 300 to 600 m2/g, a micropore specific surface area of 270 to 500 m2/g, and a micropore volume of 0.14 to 0.25 cm3/g is used.

* * * * *